July 5, 1960
C. B. DICKINSON
2,944,160
OSCILLATORY MOTOR-GENERATOR
Filed May 16, 1958
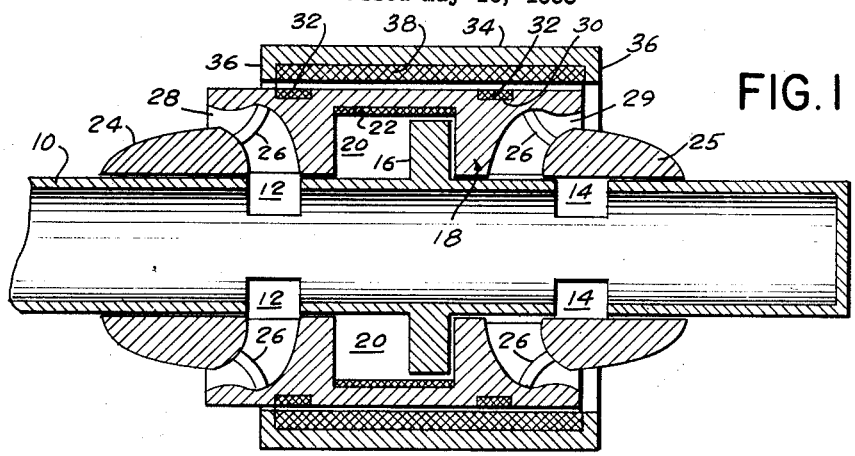
FIG. 1
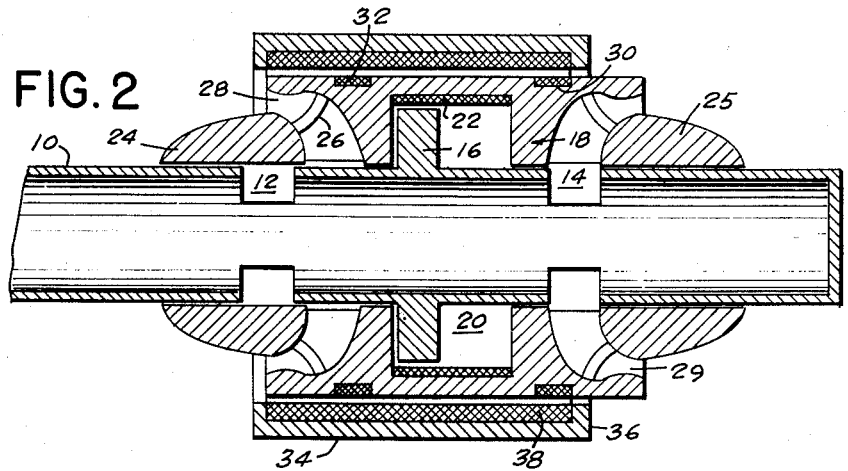
FIG. 2
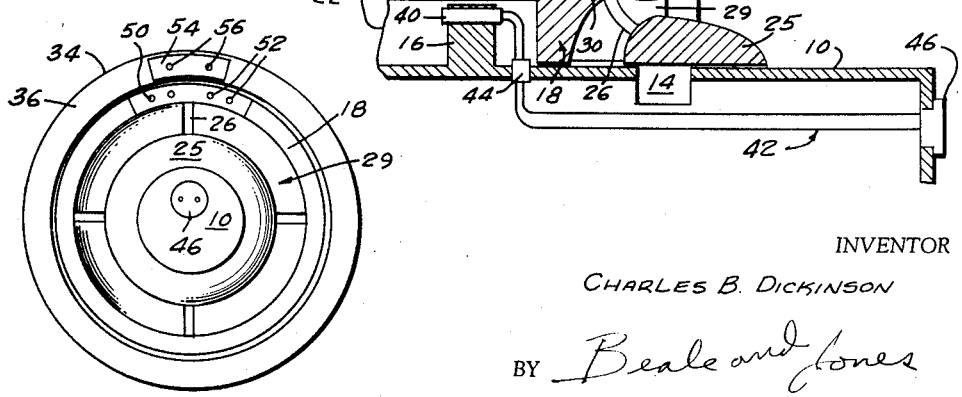
FIG. 3
FIG. 4
INVENTOR
CHARLES B. DICKINSON
BY Beale and Jones
ATTORNEYS United States Patent Office 2,944,160
Patented July 5, 1960

2,944,160
OSCILLATORY MOTOR-GENERATOR

Charles B. Dickinson, 1307 Kennamar Drive, Huntsville, Ala.

Filed May 16, 1958, Ser. No. 735,813

13 Claims. (Cl. 290—1)

This invention relates to the generation of electric current and more particularly, to a motor-generator combination for producing same.

It is a primary object of this invention to provide a motor-generator having an oscillatory motion of operation rather than the more common rotary motion.

Another object of this invention is to provide a motor-generator having a fluid reaction type motor for propelling same.

Still another object of this invention is to provide a motor-generator in which no commutator is required.

Still another object of this invention is to provide a motor-generator in which no brushes or slip-rings are required.

Basically, the invention comprises a wound core member which is oscillated on a straight line path about a central point by a fluid reaction motor. The motor comprises a suitable source of fluid supply such as pressurized steam or air and has cooperating valves and fluid jets for propelling the movable core section in an alternating straight line motion about a fixed central point.

By appropriate winding modifications the production and conversion of both alternating and direct currents is made possible, giving the device extreme flexibility and a wide range of use.

These and other objects and features of the invention will become apparent in the following specification and drawings.

In the drawings:

Fig. 1 shows a cross section of the motor-generator in one extreme position of operation;

Fig. 2 shows a cross section of the motor-generator in the other extreme position of operation;

Fig. 3 is a detailed partial section of Fig. 1; and

Fig. 4 is a detailed right end view of Fig. 1 with the added detail of Fig. 3.

Referring in detail to the drawings and with particular reference to Fig. 1, the generator structure comprises a pressure tube 10 for supporting the same having exhaust ports 12 and 14 therein. Mounted integrally and concentrically with the pressure tube 10 at a position half-way between the exhaust ports 12 and 14, is a field magnet 16. The field magnet may be either of the permanent magnet or the electromagnetic type depending on the type of generator operation desired.

Slidably mounted on and concentric with the pressure tube 10 is an oscillating core section 18. The oscillating core section 18 has a centrally located internal cylindrical cavity generally indicated at 20 which encloses the field magnet 16.

Mounted on the inner circumference of the internal cavity 20 is an armature winding 22 which cooperates with the magnetic flux set up by the field magnet 16 to induce voltages in the armature winding 22 when motion is imparted to the oscillating core section 18.

A pair of exhaust port control sleeves 24 and 25 are mounted, one at each end, in spaced apart relation from the oscillating core section 18 by means of a plurality of structural spiders 26 and are slidably and concentrically mounted on the pressure tube 10. The space intermediate the oscillating core section 18 and the spaced apart exhaust port control sleeves 24 and 25, across part of which the structural spiders 26 extend, comprises a pair of opposed acting directional fluid reaction ports 28 and 29. The fluid reaction ports 28 and 29 are associated with exhaust port control sleeves 24 and 25, respectively.

The spacing between the exhaust port control sleeves 24 and 25 and the oscillating core section 18 at the points where both the sleeves and the core section touch the surface of the pressure tube 10 is very nearly equal to the axial length of the exhaust ports 12 and 14, respectively.

As shown in the drawing, the oscillating core section 18 has hollowed out end sections which partially envelop and are contoured to the exhaust port control sleeves 24 and 25 in such a way that the dynamic flow of reaction fluid from the pressure pipe through the exhaust ports 12 and 14 and directional fluid reaction ports 28 and 29 will be at an optimum.

The outer circumference of the oscillating core section 18 is provided with winding lots 30 for receiving a commutating winding 32. The commutating winding 32 is arranged for selective interconnection with the internally mounted armature winding 22. This feature will be described at a later point in the specification.

Circumferentially mounted with respect to the oscillating core section 18 and the pressure tube 10 and in fixed relation to the pressure tube is an outer core member and housing 34 having downturned end flanges 36.

A fixed output winding 38 is mounted in juxtaposition to the internal surface of the outer core member 34.

Referring to Figs. 3 and 4, a detailed showing of the coil interconnections is illustrated with the field magnet 16 shown as being electromagnetic rather than as a permanent magnet.

A field winding 40 is shown mounted on the field magnet 16. A pair of input leads 42 is attached thereto which run from the field winding 40, through a seal 44 in the wall of the pressure tube adjacent the field magnet 16, through the pressure tube 10 to the closed end wall thereof. A sealed contact terminal block 46 is inserted in the closed end wall of the pressure tube 10 to provide the external connections for the field winding 40.

A contact terminal block 48 is provided on the end of the oscillating core section 18 to provide external connections for both the armature winding 22 and the commutating winding 32. Input lead pairs 50 and 52 are provided for the armature winding 22 and the commutating winding 32, respectively. Selective interconnection of the armature and commutating windings may be accomplished by use of the terminal block 48.

A terminal block 54 is mounted on the end flange 36 of the outer housing and core section. A pair of leads 56 extend from the terminal block 54 through the flange 36 to the fixed output winding 38. This provides the external connection for the output winding 38.

The following sections show the versatility of my invention.

*Generation of alternating current*

When it is desired to produce alternating current with the subject device the field magnet 16, which may be either permanent or electromagnetic, and the armature winding 22 are the only electrical components necessary. Oscillation of the oscillating core section 18 on the pressure tube 10 about the field magnet 16 and its resulting magnetic field induces an alternating voltage in the armature winding 22. The voltage in the armature winding 22 is taken from the machine to a desired load through leads 50 and the external terminal block 48 mounted on the end of the oscillating core section 18.

Generation of direct current

The generation of direct current by the subject device requires the series interconnection of the armature winding 22 and the commutating winding 32. This is accomplished by the use of a suitable jumper connection on the terminal block 48 mounted on the end of the oscillating core section 18. The load to be supplied is connected to the terminal block 54 which is mounted on the downturned end flange 36 on the outer core and housing member 34. Leads 56 between the terminal block 54 and the fixed output winding 38 serve to connect the fixed output winding 38 to the load.

Since the armature and commutating windings 22 and 32, respectively, are serially interconnected, the alternating voltage induced in the armature winding 22 as a result of the motion of the oscillatory core section 18 in the magnetic field of the field magnet 16 is conveyed into the commutating winding 32. The alternating voltage in the commutating winding 32 sets up an alternating magnetic field in the air gap between the commutating winding 32 and the fixed output winding 38 on the outer core and housing member 34.

In view of the fact that the alternating magnetic field has been set up in a winding having a straight line oscillatory or alternating motion and that this alternating magnetic field is given a translatory motion with respect to a fixed winding, the resultant voltage induced in the fixed winding is a pulsating direct current type. Thus, the voltage induced in the fixed output winding 38 by the complex alternation of the magnetic field produced by the alternation of and alternating voltage in the commutating winding 32 is a pulsating direct current voltage.

Conversion of alternating current to direct current

A current converting action may be accomplished by the subject device by feeding an alternating input voltage to the commutating coil 32 through the terminal block 48 and input leads 52. This sets up the necessary alternating magnetic field in the air gap between the commutating winding 32 and the fixed output winding 38 to produce a pulsating direct current output through the leads 56 and terminal block 54. The motion of the oscillatory core section 18, of course, would have to be synchronized with the alternating voltage input to produce a full rectifying effect.

The conversion effect could be changed to the inversion of direct to alternating current by supplying a direct current input through the terminal block 46 and leads 42 to the field winding 40 of the field magnet 16. The output would be taken from the armature winding 22 through the leads 50 and terminal block 48. The output would be proportional to the input within the region determined by the magnetic saturation curve of the field magnet 16.

The general operation of the device with respect to all of the preceding sections is as follows:

A unidirectional magnetic field is set up by the field magnet 16 and fluid under pressure is admitted into the pressure tube 10.

In the position of Fig. 1 the pressurized fluid in the pressure tube 10 is forcibly exhausted through the exhaust ports 12 in the walls of the pressure tube 10 and thence accelerated and directionally expelled through the fluid reaction ports 28.

The jet reaction at the ports 28 impels the oscillating core section 18 from the position shown in Fig. 1 to the position shown in Fig. 2. The exhaust port control sleeves 24 and 25 are connected to the oscillating core section 18 by the structural spiders 26. Movement of the core section 18 from the position in Fig. 1 to the position in Fig. 2 causes the left hand control sleeve 24 to close the left hand exhaust port 12 as the core section 18 moves from left to right. At the same time, however, the right hand control sleeve 25 is moved to open the right hand exhaust port 14 in a progressive fashion until it is fully open in the position of Fig. 2, concurrent with the progressive closing of the left hand exhaust port 12.

The progressive concurrent opening and closing of the exhaust ports 12 and 14 in cooperation with the fluid reaction ports 28 and 29, respectively, produces a sinusoidal oscillation in the oscillating core section 18 about the center point of field magnet 16.

It can be seen from the above specification and drawings that I have provided a device which is simple in structure and highly versatile in operation.

It is to be understood that the particular modification described and shown is for the purpose of example only and is not to be construed as the sole form of my invention.

I claim:

1. An oscillatory motor generator comprising, in combination, a pressure tube, a fixed field magnet concentric with said pressure tube and supported thereby, axially spaced fluid exhaust ports in said pressure tube equidistant from said fixed field magnet on either side thereof, an oscillating core section movably mounted on said pressure tube in concentric relationship thereto, said oscillating core section being supported by said pressure tube in the region between said exhaust ports, a pair of exhaust port control sleeves attached one on each end of said oscillating core section in spaced apart relation therefrom, said exhaust port control sleeves being movably and concentrically mounted with respect to said pressure tube to alternately open and close said axially spaced exhaust ports in response to the oscillations of said oscillating core section, the space between said exhaust port control sleeves and the ends of said oscillating core section defining axially disposed and oppositely directed fluid reaction ports which cooperate with said exhaust port control sleeves and said axially spaced exhaust ports to provide alternating oppositely directed thrusts to said oscillating core section to produce oscillatory motion thereof, an armature winding on said oscillating core section, a commutating winding on said oscillating core section, a fixed outer core and housing member concentrically mounted with respect to said oscillating core section and a fixed output winding mounted on the internal periphery of said fixed outer core and housing member.

2. The device as described in claim 1 wherein said oscillating core section has an axially disposed internal cavity concentric with said pressure tube and enclosing said fixed field magnet, said armature winding being mounted on the periphery of said internal cavity and said commutating winding being mounted on the outer periphery of said oscillating core section.

3. An oscillatory motor generator comprising, in combination, a pressure tube, a fixed field magnet mounted on said pressure tube in concentric relationship therewith, an oscillating core section movably mounted on said pressure tube in concentric relationship therewith and enclosing said fixed field magnet, axially spaced exhaust ports in said pressure tube equidistant from either side of said fixed field magnet, exhaust port control means mounted on said oscillating core section, and oppositely directed fluid reaction ports between said exhaust port control means and said oscillating core section for providing alternating oppositely directed thrusts to said oscillating core section to impart oscillatory motion thereto.

4. An oscillatory motor generator comprising, in combination, a pressure tube, a fixed field magnet mounted on said pressure tube in concentric relationship therewith, an oscillating core section movably mounted on said pressure tube in concentric relationship therewith, an internal cavity in said oscillaitng core member enclosing said fixed field magnet and having a surface therein concentric with said pressure tube, an armature winding mounted on said surface of said internal cavity, axially spaced exhaust ports in said pressure tube equidistant from either side of said fixed field magnet, exhaust port control means mounted on said oscillating core section, oppositely directed fluid reaction ports between said exhaust port control means and said oscillating core section for providing alternating oppositely directed thrusts to said oscillating core section to impart oscillatory motion thereto about said fixed field magnet, the relative motion between the armature winding on said oscillating core section and the magnetic field of said fixed field magnet inducing an alternating voltage in said armature winding.

5. The device as described in claim 4 wherein said oscillating core section has a commutating winding mounted on the external periphery thereof electrically connected in series with said armature winding such that the alternating voltage induced in said armature winding sets up an alternating magnetic field about said commutating winding, a fixed outer core and housing member concentric with said oscillating core section, a fixed output winding mounted on the inner periphery of said fixed outer core and housing member in a spaced apart cooperative relationship with said commutating winding, the alternating magnetic field of said commutating winding and said commutating winding having imparted thereto a translatory oscillating motion with respect to said fixed output winding, whereby the combined effect of the alternating magnetic field and the translatory oscillating motion thereof with reference to the fixed output winding induces a pulsating direct current voltage in said fixed output winding.

6. The device as described in claim 3 comprising, in combination, a source of alternating current external to said motor generator, a commutating winding on said oscillating core section electrically connected to said external source of alternating current whereby an alternating magnetic field is set up about said commutating winding, a fixed outer core and housing member concentric with said oscillating core section, a fixed output winding mounted on the inner periphery of said fixed outer core and housing member in operative association with said commutating winding, the alternating magnetic field of said commutating winding and said commutating winding having imparted thereto a translatory oscillating motion with respect to said fixed output winding, whereby the combined effect of the alternating magnetic field and the translatory oscillating motion thereof with reference to the fixed output winding induces a pulsating direct current voltage in said fixed output winding.

7. An oscillatory generator comprising a fixed field magnet, an oscillating core section concentrically mounted with respect to said fixed field magnet, an armature winding on said oscillating core section, a selectively connected commutating winding on said oscillating core section, a fixed outer core and housing member concentric with said oscillating core section and said fixed field magnet and a fixed output winding mounted on the inner periphery of said fixed outer core and housing member.

8. An oscillatory generator comprising a fixed field magnet, an oscillating core section concentrically mounted with respect to said fixed field magnet, an armature winding on said oscillating core section, a selectively connected commutating winding on said oscillating core section, means to selectively connect said commutating winding in series relationship with said armature winding, a fixed outer core and housing member concentric with said oscillating core section and said fixed field magnet and a fixed output winding mounted on the inner periphery of said fixed outer core and housing member.

9. An oscillatory generator comprising a fixed field magnet, an oscillating core section concentrically mounted with respect to said fixed field magnet, an internal cavity in said oscillating core section for enclosing said fixed field magnet, an armature winding on said oscillating core section, a selectively connected commutating winding on said oscillating core section, a fixed outer core and housing member concentric with said oscillating core section and said fixed field magnet and a fixed output winding mounted on the inner periphery of said fixed outer core and housing member.

10. The device as described in claim 9 wherein said armature winding is mounted on the periphery of the internal cavity in said oscillating core section.

11. The device as described in claim 9 wherein said commutating winding is mounted on the outer periphery of said oscillating core section.

12. In an oscillatory motor generator, in combination, a pressure tube, spaced apart exhaust ports in said pressure tube, an oscillating core section mounted on said pressure tube intermediate said spaced apart exhaust ports, exhaust port control means mounted on said oscillating core section, and oppositely directed fluid reaction ports between said exhaust port control means and said oscillating core section for providing alternating oppositely directed thrusts to said oscillating core section to impart oscillatory motion thereto.

13. An oscillatory motor generator comprising, in combination, a pressure tube, an oscillating core section movably mounted on said pressure tube, a field magnet mounted on said pressure tube intermediate said spaced apart exhaust ports and interior of said oscillating core section, exhaust port control means mounted on said oscillating core section, and oppositely directed fluid reaction ports in said oscillating core section adjacent said exhaust port control means for providing alternating oppositely directed thrusts to said oscillating core section to impart oscillatory motion thereto.

References Cited in the file of this patent

UNITED STATES PATENTS

| 1,544,010 | Jordan | June 30, 1925 |
| 2,297,251 | Schild | Sept. 29, 1942 |